US009674845B2

(12) United States Patent
Chen et al.

(10) Patent No.: US 9,674,845 B2
(45) Date of Patent: Jun. 6, 2017

(54) SOFT BUFFER MANAGEMENT

(71) Applicant: QUALCOMM Incorporated, San Diego, CA (US)

(72) Inventors: Wanshi Chen, San Diego, CA (US); Peter Gaal, San Diego, CA (US); Tao Luo, San Diego, CA (US); Hao Xu, San Diego, CA (US); Durga Prasad Malladi, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 14/502,848

(22) Filed: Sep. 30, 2014

(65) Prior Publication Data

US 2015/0124740 A1 May 7, 2015

Related U.S. Application Data

(60) Provisional application No. 61/899,666, filed on Nov. 4, 2013.

(51) Int. Cl.
*H04W 4/00* (2009.01)
*H04W 72/08* (2009.01)
*H04W 16/14* (2009.01)
*H04L 1/18* (2006.01)
*H04L 5/00* (2006.01)
*H04L 27/00* (2006.01)

(52) U.S. Cl.
CPC ......... *H04W 72/082* (2013.01); *H04L 1/1835* (2013.01); *H04L 5/001* (2013.01); *H04L 27/0006* (2013.01); *H04W 16/14* (2013.01)

(58) Field of Classification Search
None
See application file for complete search history.

(56) References Cited

U.S. PATENT DOCUMENTS

2007/0286122 A1* 12/2007 Fonseca ............... H04L 1/0021
370/329
2011/0199951 A1* 8/2011 Kwon ............... H04W 52/0212
370/311

(Continued)

FOREIGN PATENT DOCUMENTS

WO WO-2013070837 A1 5/2013

OTHER PUBLICATIONS

International Search Report and Written Opinion—PCT/US2014/058604—ISA/EPO—Jan. 5, 2015.

(Continued)

*Primary Examiner* — Phirin Sam
(74) *Attorney, Agent, or Firm* — Larry J. Moskowitz

(57) ABSTRACT

Soft buffer management is disclosed in which a base station determines a first number of component carriers (CCs) monitored by a user equipment (UE) and determines a second number of CCs for partitioning a soft buffer for storing one or more unsuccessfully decoded data packets, wherein the second number is different than the first number. Various aspects provide for determination of the second number of CCs using clear channel assessment (CCA) clearance information with regard to unlicensed CCs used in the communication system.

30 Claims, 9 Drawing Sheets

(56) References Cited

U.S. PATENT DOCUMENTS

| | | | |
|---|---|---|---|
| 2012/0014357 A1* | 1/2012 | Jung | H04L 5/0035 370/332 |
| 2012/0087396 A1* | 4/2012 | Nimbalker | H04L 1/1822 375/219 |
| 2012/0120889 A1* | 5/2012 | Cheng | H04L 1/1835 370/329 |
| 2012/0188952 A1* | 7/2012 | Baldemair | H04L 1/1822 370/329 |
| 2013/0070611 A1* | 3/2013 | Ahn | H04W 52/286 370/241 |
| 2013/0136094 A1* | 5/2013 | Wei | H04W 52/0203 370/329 |
| 2013/0195073 A1* | 8/2013 | Chen | H04L 5/0023 370/331 |
| 2013/0203458 A1* | 8/2013 | Charbit | H04W 52/34 455/522 |
| 2013/0215759 A1* | 8/2013 | Wang | H04L 1/1621 370/241 |
| 2013/0286970 A1* | 10/2013 | Wang | H04W 72/04 370/329 |
| 2013/0316660 A1* | 11/2013 | Hsin | H04W 74/0808 455/73 |
| 2014/0198758 A1* | 7/2014 | Nimbalker | H04L 1/1822 370/329 |
| 2015/0180616 A1* | 6/2015 | Lee | H04L 1/1812 370/329 |
| 2016/0081118 A1* | 3/2016 | Porat | H04W 72/0493 370/329 |
| 2016/0218996 A1* | 7/2016 | Gerstenberger | H04L 1/1835 |

OTHER PUBLICATIONS

LG Electronics: "Enhancement to Time-domain Resource Partitioning", 3GPP Draft; R1-112333, 3rd Generation Partnership Project (3GPP), Mobile Competence Centre ; 650, Route Des Lucioles; F-06921 Sophia-Antipolis Cedex ; France, vol. RAN WG1, no. Athens, Greece; Aug. 22, 2011, Aug. 16, 2011, XP050537470, 3 pages.[retrieved on Aug. 16, 2011].

* cited by examiner

SOFT BUFFER MANAGEMENT

CROSS-REFERENCE TO RELATED APPLICATIONS

This application claims the benefit of U.S. Provisional Patent Application No. 61/899,666, entitled, "SOFT BUFFER MANAGEMENT", filed on Nov. 4, 2013, which is expressly incorporated by reference herein in its entirety.

BACKGROUND

Field

Aspects of the present disclosure relate generally to wireless communication systems, and more particularly, to soft buffer management in wireless systems including unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining, by a base station, a first number of component carriers (CCs) monitored by a UE and determining, by the base station, a second number of CCs for partitioning a soft buffer for storing one or more unsuccessfully decoded data packets, wherein the second number is different than the first number.

In an additional aspect of the disclosure, an apparatus configured for wireless communication includes means for determining, by a base station, a first number of CCs monitored by a UE and means for determining, by the base station, a second number of CCs for partitioning a soft buffer for storing one or more unsuccessfully decoded data packets, wherein the second number is different than the first number.

In an additional aspect of the disclosure, a computer-readable medium having program code recorded thereon includes code to determine, by a base station, a first number of CCs monitored by a UE and code to determine, by the base station, a second number of CCs for partitioning a soft buffer for storing one or more unsuccessfully decoded data packets, wherein the second number is different than the first number.

In an additional aspect of the disclosure, an apparatus includes at least one processor and a memory coupled to the processor. The processor is configured to determine, by a base station, a first number of CCs monitored by a UE and to determine, by the base station, a second number of CCs for partitioning a soft buffer for storing one or more unsuccessfully decoded data packets, wherein the second number is different than the first number.

DETAILED DESCRIPTION

Figure 1:
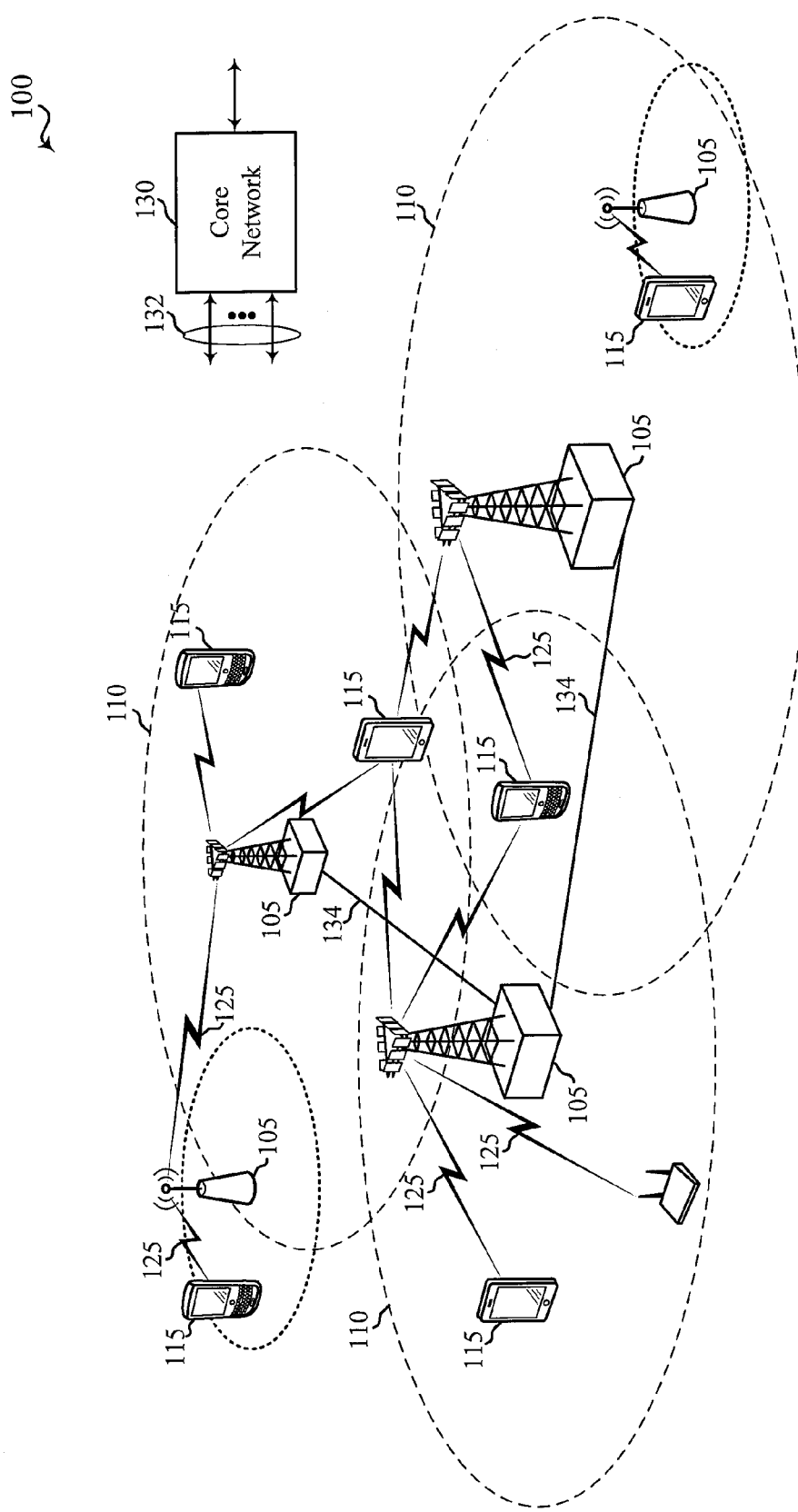
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE in an unlicensed spectrum may be compatible with carrier-grade WiFi, making LTE/LTE-Advanced (LTE-A) with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network on an unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network. In this case, there may be a loose interworking between LTE/LTE-A with and without unlicensed spectrum based on RLC-level aggregation with co-located cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more modes of operation or deployment scenarios with unlicensed spectrum. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with and without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-11.

Figure 2A:
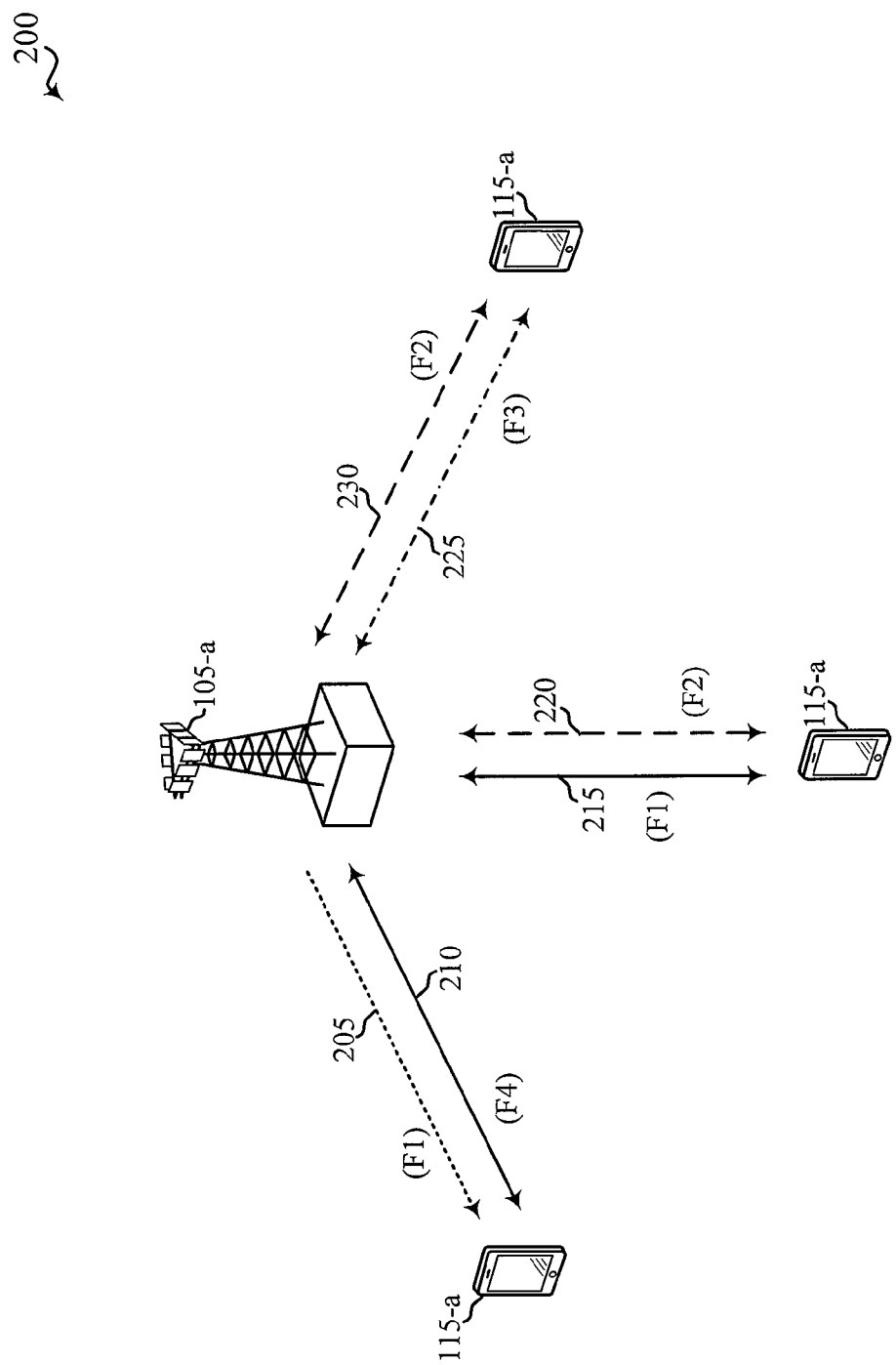
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-*a*. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A with an unlicensed band is a traditional MNO with LTE spectrum. For these service providers, an operational configuration may include a bootstrapped mode (e.g., supplemental downlink, carrier aggregation) that uses the primary component carrier (PCC) on the licensed spectrum and the secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
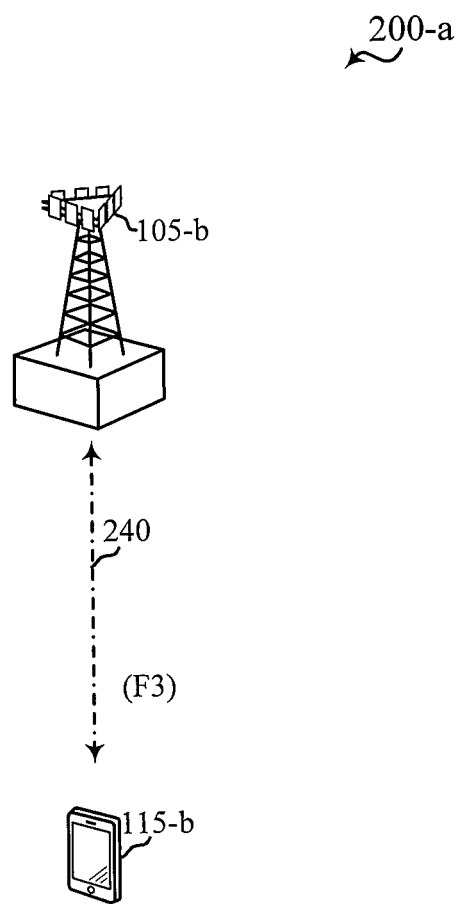
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the LTE/LTE-A with unlicensed spectrum PCC on the unlicensed spectrum. Moreover, LBT may be implemented on both the base station and the UE.

Figure 3:
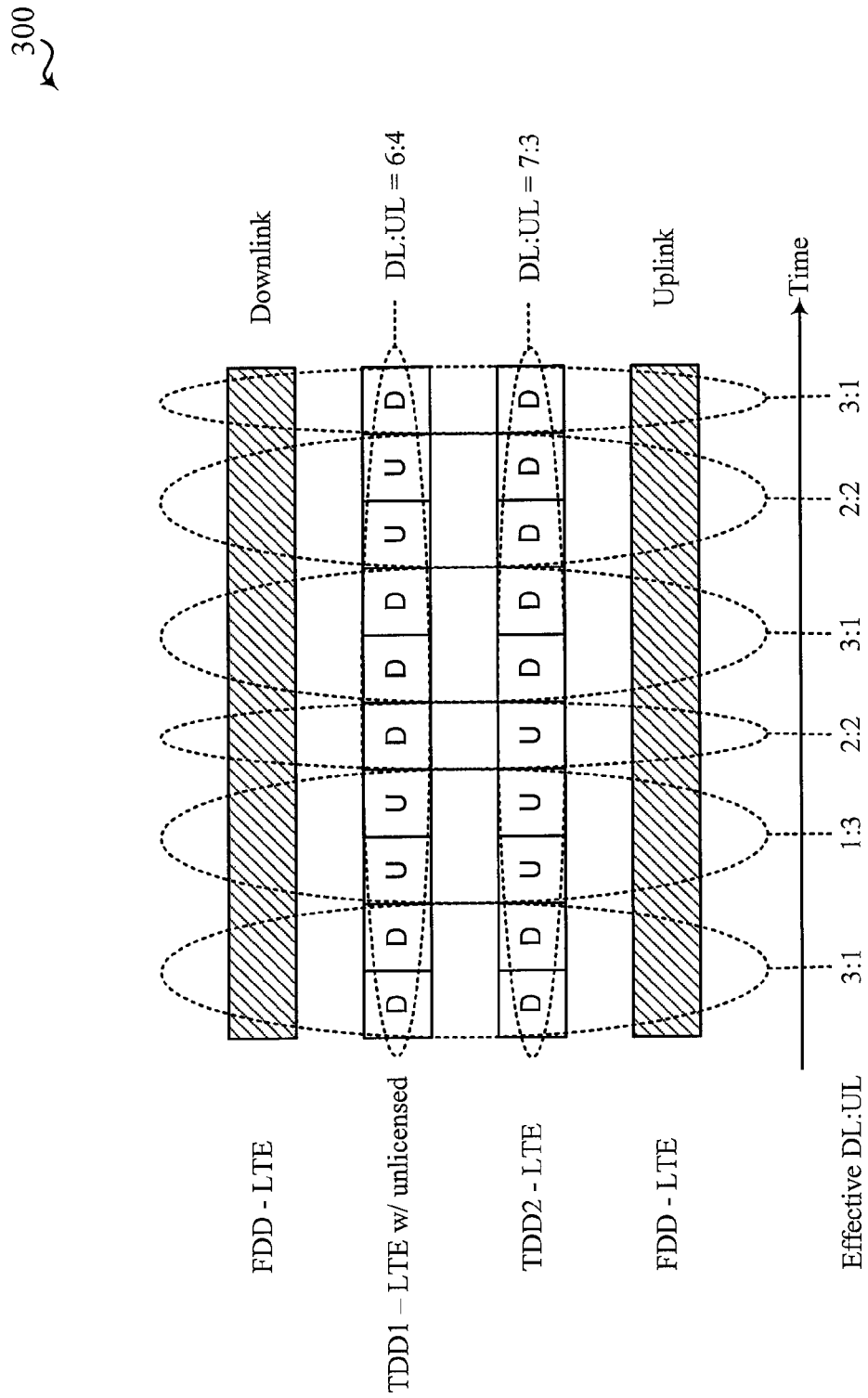
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
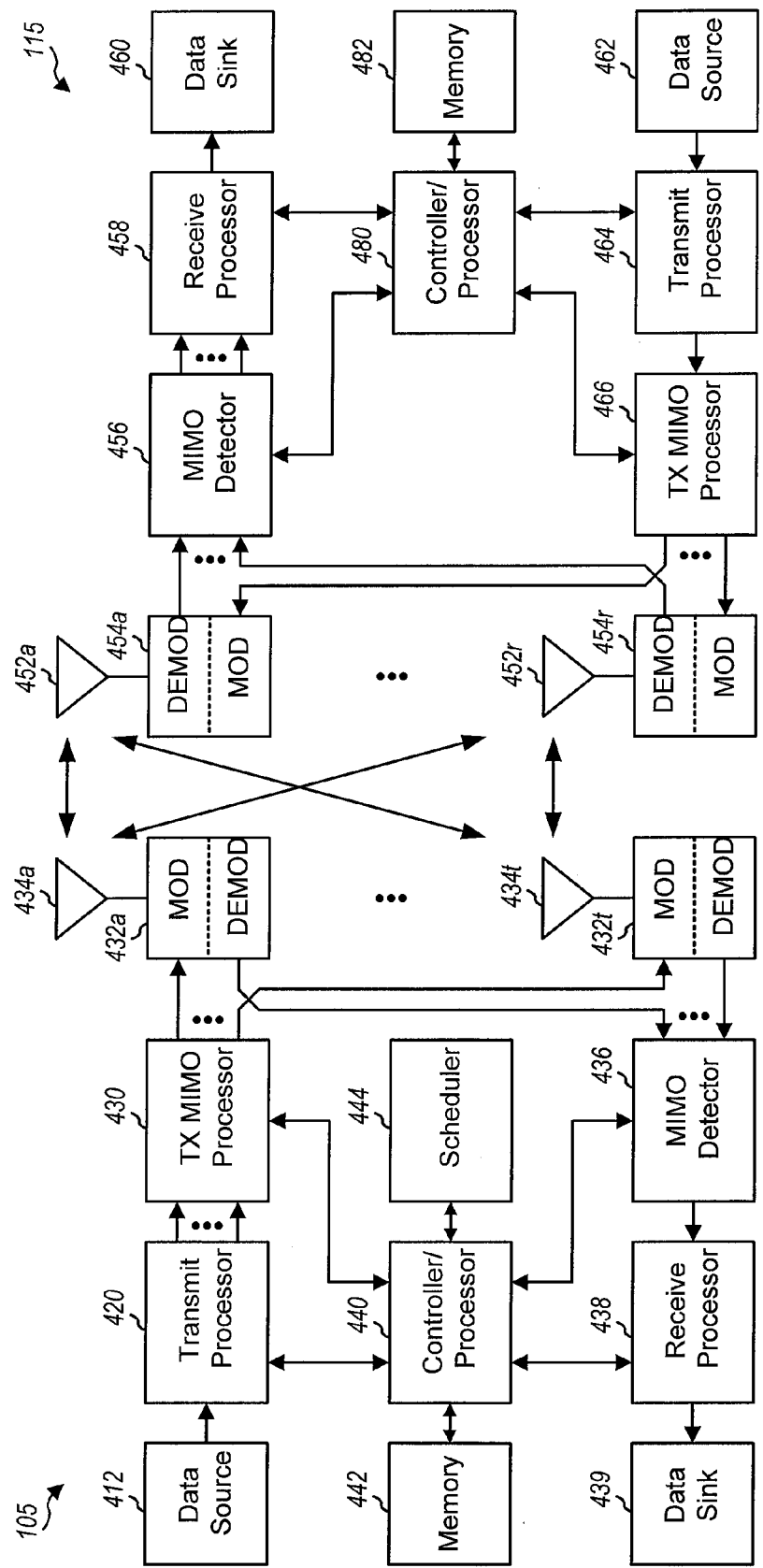
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434*a* through 434*t*, and the UE 115 may be equipped with antennas 452*a* through 452*r*. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 5-11, and/or other processes for the techniques described herein. The memories 442 and 482 may store data and program codes for the eNB 105 and the UE 115, respectively. A scheduler 444 may schedule UEs for data transmission on the downlink and/or uplink.

In LTE, a UE may be configured with two or more component carriers or CCs and assigned to one of eight UE categories in which each such category is associated with a total number of soft channel bits. Table 1 provides the current eight defined categories along with the associated maximum number of downlink shared channel (DL-SCH) transport block bits that are received within a given transmission time interval (TTI), the maximum number of bits of a DL-SCH transport block that can be received within a TTI, the total number of soft channel bits available to the soft buffer, and the maximum number of supported layers for spatial multiplexing in the downlink.

TABLE 1

| UE Category | Max. Number of DL-SCH transport block bits received within a TTI | Max. Number of bits of a DL-SCH transport block received within a TTI | Total Number of Soft Channel Bits | Max. Number of supported layers for spatial multiplexing in DL |
| --- | --- | --- | --- | --- |
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

As shown in Table 1, Categories 6 and 7 may use either 2 or 4 layers for spatial multiplexing. Accordingly, the maximum numbers of bits of the DL-SCH transport block that can be received within a TTI is different depending on whether 2 or 4 layers are used.

The soft buffer is provided for storing unsuccessfully decoded data packets for use in soft combining with retransmitted data packets according to the downlink hybrid automatic repeat request (HARQ) processes. Within each CC used downlink transmissions each HARQ process is generally split evenly across the CC. There are different numbers of available HARQ processes depending on whether the transmissions are frequency division duplex (FDD) or time division duplex (TDD) and, if in TDD, which uplink/downlink subframe configuration is used. In FDD, there are up to 8 downlink HARQ processes. In TDD, the number of downlink HARQ processes depends on TDD uplink/downlink subframe configuration, and can be up to 15, as illustrated in Table 2 below. The soft buffer is generally partitioned, in a semi-static manner, among HARQ processes, codewords, and number of configured CCs.

TABLE 2

| TDD UL/DL Configuration | Maximum Number of HARQ Processes |
| --- | --- |
| 0 | 4 |
| 1 | 7 |
| 2 | 10 |
| 3 | 9 |
| 4 | 12 |
| 5 | 15 |
| 6 | 6 |

At a base station or eNB, the soft buffer size for a transport block may be represented by the following equation:

$$N_{IR} = \left\lfloor \frac{N_{soft}}{K_C \cdot K_{MIMO} \cdot \min(M_{DL\_HARQ}, M_{limit})} \right\rfloor \quad (1)$$

The values of the different variables of Equation (1) may be different depending on whether the UE signals ue-Category-v10xy or ue-Category. When the UE signals ue-Category-v10xy, and is further configured with transmission mode 9/10 for the downlink cell, $N_{soft}$ represents the total number of soft channel bits according to the UE category indicated by ue-Category-v10xy. Otherwise, when the UE signals ue-Cate gory, $N_{soft}$ represents the total number of soft channel bits according to the UE category indicated by ue-Cate gory. Thus, for example, if $N_{soft}$=35,982,720, then $K_C$=5, or if $N_{soft}$=3,654,144 and the UE is capable of supporting no more than a maximum of two spatial layers for the downlink cell, $K_C$=2. Otherwise, $K_C$=1. $K_{MIMO}$ indicates whether the transmission includes MIMO transmission and may be set to 2, for example, when the UE is configured to receive PDSCH transmissions based on transmission modes 3, 4, 8, 9 or 10 (on the given component carriers (CC)), and would be set to a different value, such as 1, if the UE is configured to receive PDSCH transmissions based on a different transmission mode. When the UE is configured with more than one serving cell and at least two serving cells have different uplink/downlink configurations, then $M_{DL\_HARQ}$ may represent the maximum number of downlink HARQ processes for the downlink-reference uplink/downlink configuration of the serving cell. Otherwise, $M_{DL\_HARQ}$ would represent the maximum number of downlink HARQ processes. $M_{limit}$ represents a constant that is selected as an estimated maximum limit to the number of HARQ processes that might be available. In certain representative aspects, $M_{limit}$ may be selected as 8.

For soft buffer partitioning on the UE side, both for frequency division duplex (FDD) and TDD, if the UE is configured with more than one serving cell, then for each serving cell, for at least $K_{MIMO} \cdot \min(M_{DL\_HARQ}, M_{limit})$ transport blocks, upon decoding failure of a code block of a transport block, the UE may store received soft channel bits corresponding to a range of at least $w_k, w_{k+1}, \ldots, w_{mod(k+n_{SB}-1, N_{cb})}$, where:

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right) \quad (2)$$

Where, C represents the number of code blocks, $N_{cell}^{DL}$ represents the number of configured cells for downlink, $N_{cb}$ represents the soft buffer size for a code block at eNB, and $N_{soft}' = N_{soft}$.

Because of the use of unlicensed spectrum in hybrid licensed/unlicensed communications, such as LTE/LTE-A with unlicensed spectrum, there are various specific properties associated with LTE/LTE-A with unlicensed spectrum and other communication systems that incorporate use of unlicensed spectrum. For example, over the total number of CCs configured for a UE, in a given frame ($N_{LTE-Unlicensed}$), the total number of CCs with clear channel assessment (CCA) cleared can be less than $N_{LTE-Unlicensed}$. Some LTE/LTE-A unlicensed spectrum component carriers may not have the CCA cleared for a frame. In each CC, depending on the deployment scenario (e.g., supplemental downlink (SDL), carrier aggregation (CA), or standalone (SA)), and HARQ design, the maximum number of HARQ processes may be large. Moreover, some HARQ processes may have small HARQ-acknowledgement (ACK) timing, while others may have very large HARQ-ACK timing, even under perfect CCA clearance. In a given CC, depending on CCA clearance status, one or more HARQ processes may not have a re-transmission opportunity for a long time. Samples in the corresponding soft buffer for the one or more HARQ processes may, thus, become stale.

Figure 5:
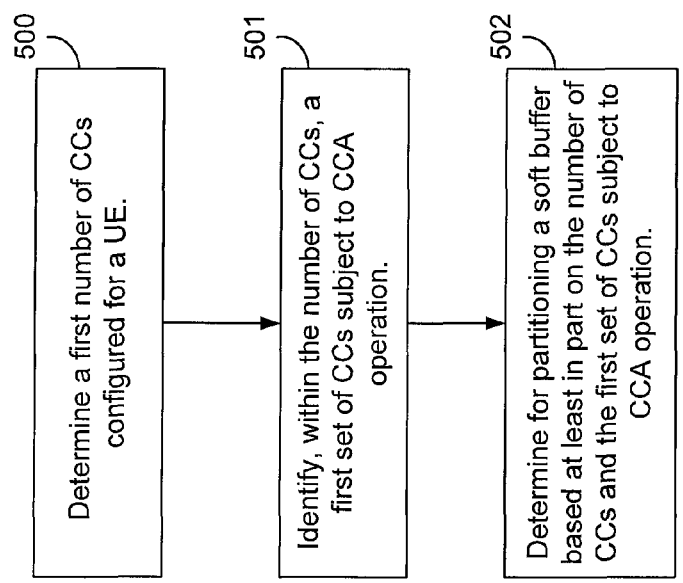

Currently, the LTE model provides for the number of CCs configured for a particular UE to be used in partitioning the soft buffer. However, because the use of unlicensed spectrum for some CCs causes transmission over such unlicensed CCs to not be guaranteed, various aspects of the present disclosure are directed to determining soft buffer partitioning using a different number of CCs than the simply the number of CCs configured for the UE. FIG. 5 is a functional block diagram illustrating example blocks executed to implement one aspect of the present disclosure. At block 500, a base station, determines a first number of CCs configured for a UE. With the use of unlicensed CCs, this first number of CCs may include the total number of unlicensed CCs configured for use by the UE.

At block 501, the base station identifies, within the number of CCs, a first set of CCs subject to CCA operation. The transmission over the first set of CCs will, thus, be subject to clear CCA checks. At block 502, the base station determines for partitioning a soft buffer based at least in part on the number of CCs and the first set of CCs subject to CCA operation. the base station determines a second number of CCs for partitioning a soft buffer, wherein the second number is different than the first number. Rather than partitioning the soft buffer only using the total number of CCs configured for the UE, the partitioning will be based at least on the total number of configured CCs and the number of CCs that are subject to CCA operations.

Various additional aspects of the present disclosure are directed to soft buffer partitioning over different CCs based on CCA clearance statistics among $N_{LTE-Unlicensed}$ configured carriers. In determining the number of configured CCs for use in soft buffer partitioning, the total number of configured CCs includes the total number of configured licensed CCs, e.g., $N_{LTE}$, and the total number of unlicensed CCs, $N_{LTE-Unlicensed}$. However, in a given frame, there may be only $K <= N_{LTE-Unlicensed}$ carriers with CCA clearance. Thus, a base station may choose different HARQ termination targets based on CCA statistics.

Figure 6:
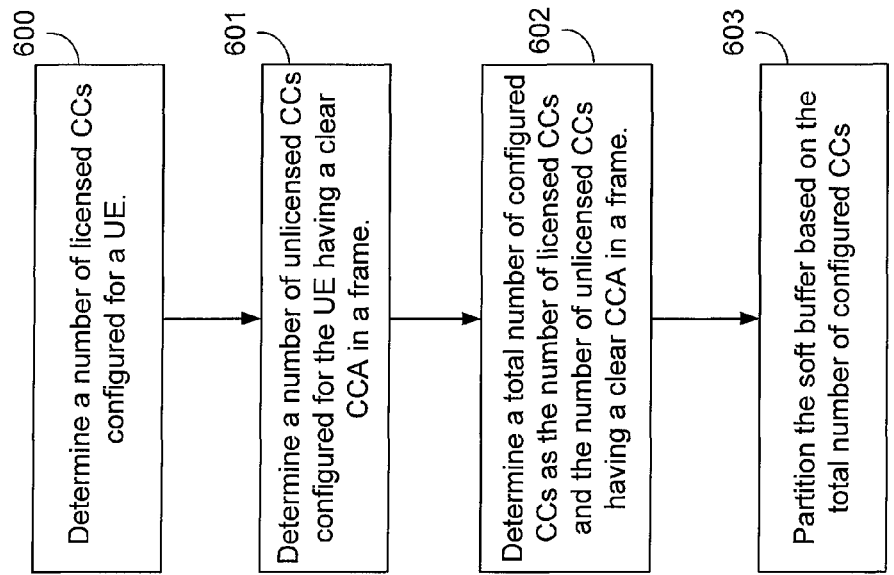
FIGS. 5-11 are functional block diagrams illustrating example blocks executed to implement various aspects of the present disclosure.

FIG. 6 is a functional block diagram illustrating example blocks executed to implement one aspect of the present disclosure. At block 600, a base station determines a number of licensed CCs monitored by the UE. At block 601, the base station determines the number of unlicensed CCs monitored by the UE and having a clear CCA in a given frame, K. In determining the total number of configured downlink CCs, $N_{cells}^{DL}$, the base station, at block 602, adds the total number of licensed CCs, $N_{LTE}$, to the cleared unlicensed CCs in the frame, K. At block 603, the base station partitions the soft buffer based on this total number of configured CCs that include the CCA clearance statistics for each frame. While this aspect provides for a number of CCs for use in partitioning that is more accurate, in some aspects, it may be too dynamic, as the number of unlicensed CCs with clear CCA detected may differ greatly in each frame.

Figures 7, 8:
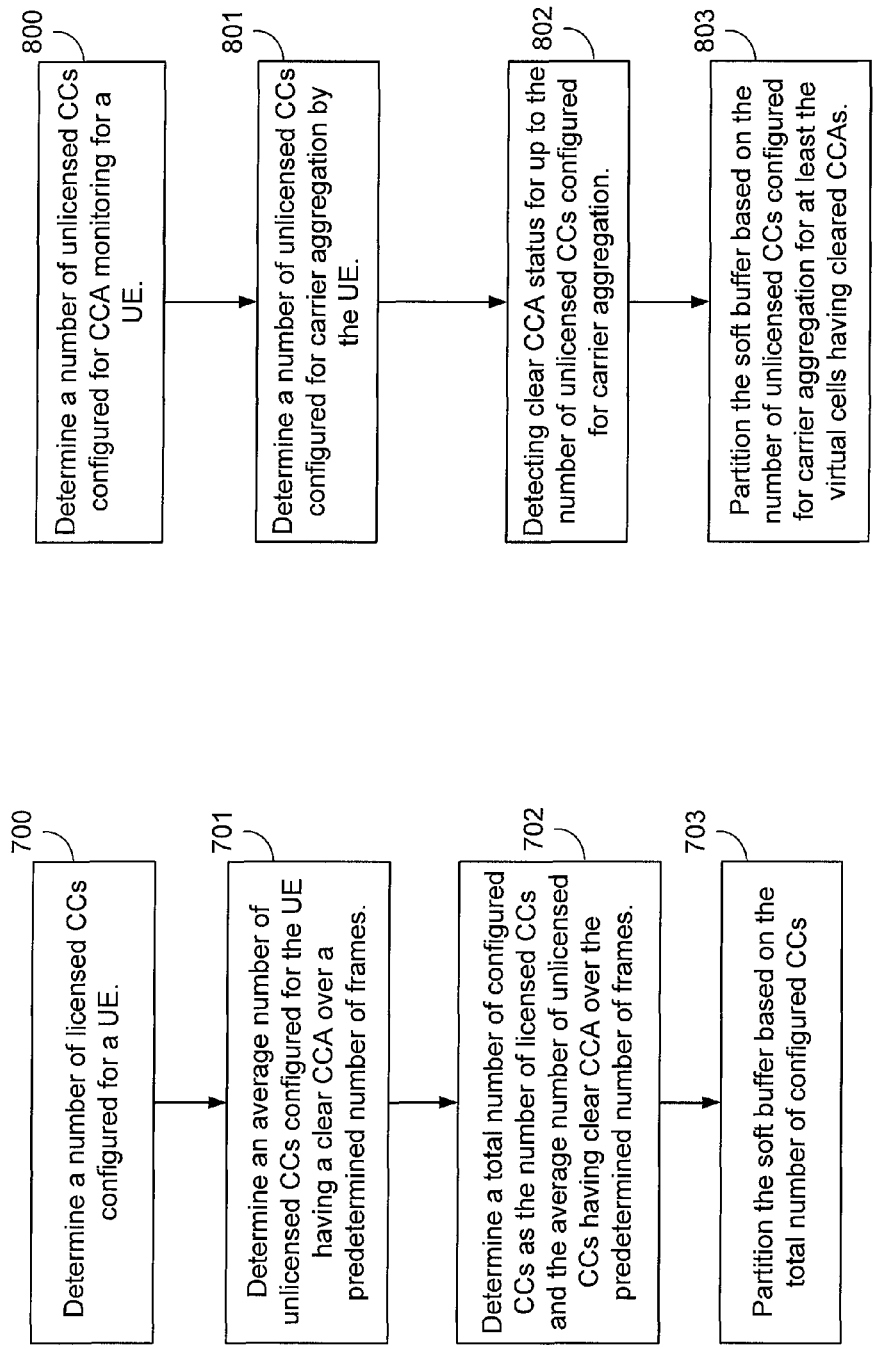

FIG. 7 is a functional block diagram illustrating example blocks executed to implement one aspect of the present disclosure. At block 700, a base station determines a number of licensed CCs monitored by the UE. At block 701, the base station determines an average number of unlicensed CCs monitored by the UE that have a clear CCA over a predetermined number of frames, M. On average over a predetermined number of frames, there may be $M <= N_{LTE-Unlicensed}$ carriers with CCA clearance. LTE/LTE-A with and without unlicensed spectrum may also have different HARQ target termination. An eNB, assuming there are $N_{LTE} \geq 0$ carriers configured for the UE would then, at block 702, instead of using $N_{cells}^{DL} = N_{LTE-Unlicensed} + N_{LTE}$ to determine the total number of configured CCs for partitioning the soft buffer, would determine the total configured CCs based on the average number of clear unlicensed CCs, M and the number of LTE CCs, $N_{LTE}$. At block 703, the base station would partition the soft buffer using the number of configured CCs based on CCA clearance statistics.

It should be noted that when determining the total number of configured CCs for partitioning, one or more licensed CCs may only be used for control signaling without data transmission. In such cases, there would be no need for soft buffer partitioning for the one or more licensed CCs being used for control signaling. Accordingly, the base station may not include the control transmission licensed CCs in the soft buffer management procedures.

It should be noted that replacing $N_{cells}^{DL}$ with $M+N_{LTE}$ may result in extra handling should the actual number of unlicensed CCs that clear the CCA check in a given frame exceed the average number used for partitioning. It should further be noted that the representative average value of the number of clear unlicensed CCs, M, may be configured by the serving cell. Equivalently, a scaling factor $\alpha \in (0, 1]$ may also be used such that $\alpha \times N_{LTE-Unlicensed} + N_{LTE} = N_{LTE}$. The various aspects of the present disclosure are not limited to any specific methods for establishing the modified number of CCs used for partitioning.

Various additional aspects of the present disclosure may use virtual cell-based soft buffer management to reflect a more accurate number of configured CCs for partitioning. A UE may be configured with N cells for CCA monitoring, and M<=N cells for carrier aggregation. The virtual cell is defined as the unlicensed CCs having clear CCAs from the M cells configured for carrier aggregation. These M cells may be any of the N configured cells, with the M cells being among the cells with CCA cleared. The various alternative aspects may perform soft buffer partitioning based on M CCs (instead of total N CCs configured for CCA monitoring).

FIG. 8 is a functional block diagram illustrating example blocks executed to implement one aspect of the present disclosure. At block 800, the base station determines a number of unlicensed CCs configured for CCA monitoring by the UE. Because transmission over unlicensed CCs is not guaranteed, many unlicensed CCs may be configured for CCA monitoring by a UE to increase the probability that more transmission capacity is achieved.

At block 801, the base station determines the number of unlicensed CCs that are configured for carrier aggregation by the UE. The number of unlicensed CCs configured for carrier aggregation at the UE may be up to the number configured for CCA monitoring. At block 802, the base station detects clear CCA statuses for any of the configured CCs up to the number configured for carrier aggregation. These cleared unlicensed CCs may be any of the total unlicensed CCs configured for CCA monitoring. At block 803, the base station partitions the soft buffer based on the number of unlicensed CCs configured for carrier aggregation for at least the virtual cells having cleared CCAs.

Figures 9, 10:
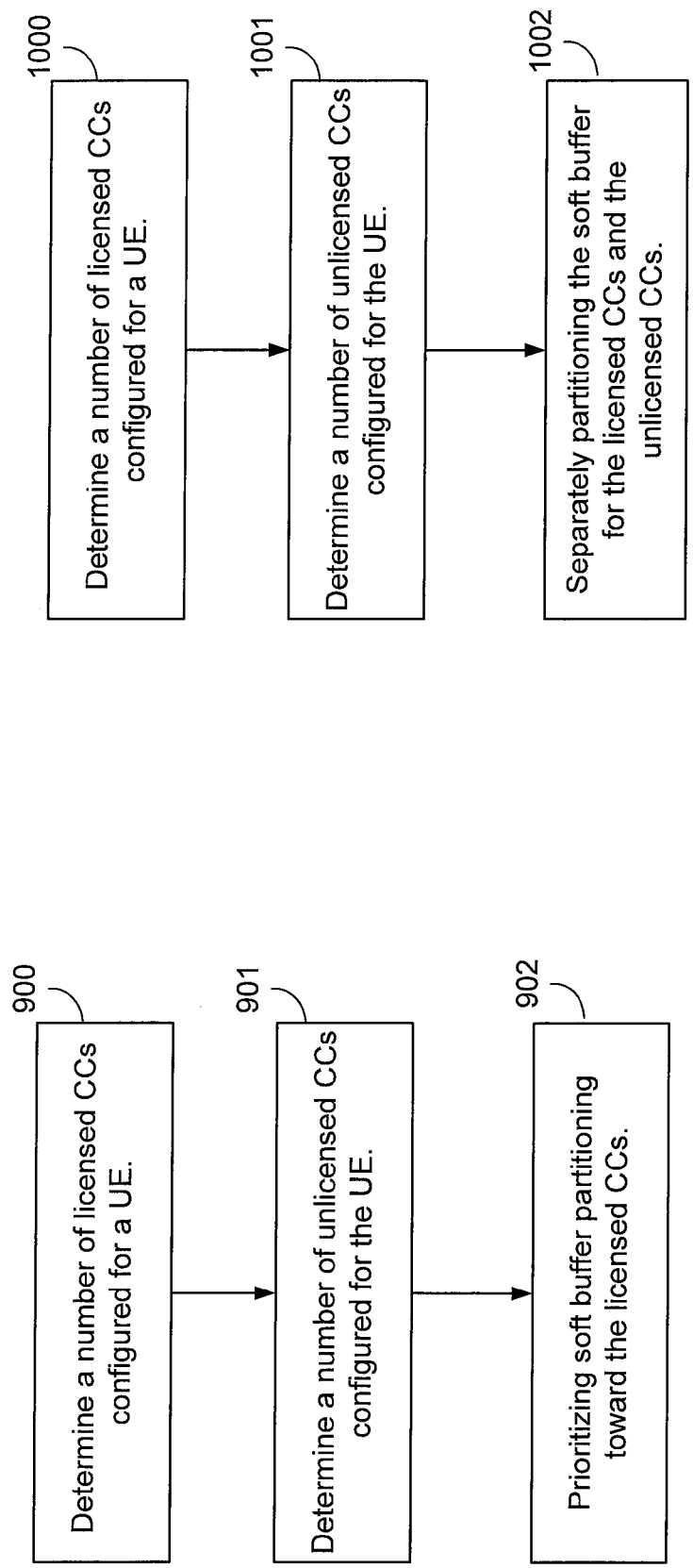

Because transmissions over the licensed CCs is guaranteed, it may be preferable to prioritize the soft buffer use in favor of such licensed CCs. FIG. 9 is a functional block diagram illustrating example blocks executed to implement one aspect of the present disclosure. At block 900, the base station determines a number of licensed CCs monitored by the UE. At block 901, the base station determines the number of unlicensed CCs monitored by the UE. At block 902, the base station may prioritize soft buffer partitioning toward the licensed CCs. The prioritization of licensed CCs over unlicensed CCs may be accomplished by manipulation of the estimated clear number of unlicensed CCs, M, where $M < N_{LTE-Unlicensed}$, or by using different formula for licensed and unlicensed CCs. For example, licensed CCs may use the formula, $N_{cells}^{DL} = M1 + N_{LTE}$ in Equation (2) for $N_{cells}^{DL}$, while unlicensed CCs may use the formula, $N_{cells}^{DL} = (M1 + N_{LTE}) \times M2/M1$, where $M2 >= M1$ in Equation (2).

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right) \quad (2)$$

The relationship of $M2 >= M1$ will weight the different formulas in order to prioritize the licensed CCs over the unlicensed CCs.

As the total number of configured CCs used for soft buffer partitioning includes both licensed and unlicensed CCs, various aspects of the present disclosure may provide for either joint or separate partitioning or soft buffer management. The above described examples assumed joint soft buffer management. However, various aspects of the present disclosure allow for the base station to separately partition the soft buffer for the licensed CCs and the unlicensed CCs. FIG. 10 is a functional block diagram illustrating example blocks executed to implement one aspect of the present disclosure. At blocks 1000 and 1001, the base station determines the number of licensed and unlicensed CCs monitored by the UE, respectively. At block 1002, the base station may separately partition the soft buffer for the licensed and unlicensed CCs, according to the aspects described herein.

It should be noted that, in additional aspects, the separate partitioning of block 1002 may also be used and may be combined with separate UE category definitions for licensed and unlicensed CCs. With reference to Table 1, a new set of UE categories may be defined for the unlicensed CCs for the UE. These new unlicensed CC UE categories may include separate bit amounts for the particular category.

It should further be noted that, the base station may determine to perform separate soft buffer management, such as through block 1002, based on the current network operations. For example, joint soft buffer management may be selected for carrier aggregation network operations, while separate soft buffer management may be selected for multi-flow or dual connectivity operations, when multiple base stations have non-ideal backhaul communications between each other.

It should further be noted that the determination of M can be assisted by UE. The UE may report some preferred M based on its own need/requirements and/or observed channel/interference/loading conditions.

It should further be noted that the $M_{limit}$ of Equations (1) and (2) for unlicensed CCs may be different from the $M_{limit}$ for licensed CCs. For example, $M_{limit}$ for LTE may be 8, while $M_{limit}$ for LTE/LTE-A with unlicensed spectrum may be 16. It should be noted that $M_{limit}$ for either licensed or unlicensed CCs may be selected as different constants than 8 or 16 in alternative aspects of the present disclosure.

Various aspects of the present disclosure are further directed to soft buffer partitioning over different HARQ processes. For simplicity, partitioning of soft buffer over different HARQ processes within a given CC is still based on "equal split" concept, where the number of HARQ processes for partitioning may still be determined using the formula: $\min(M_{DL\_HARQ}, M_{limit})$. It would be an optional aspect of the present disclosure to consider splitting the HARQ processes unequally (e.g., based on HARQ round trip time (RTT)).

In various aspects and operations of the soft buffer management procedures described here, a scenario may arise where the number of CCs used to partition the soft buffer, which are based on the CCA clearance statistics, may not match the actual number of CCs or HARQ processes scheduled. This mismatch partitioning or underbooking comes from the number of CCs used for partitioning being less than the number of scheduled CCs or the number of HARQ processes used for partitioning in the CC being less than the number of scheduled HARQ processes on the CC.

Figure 11:
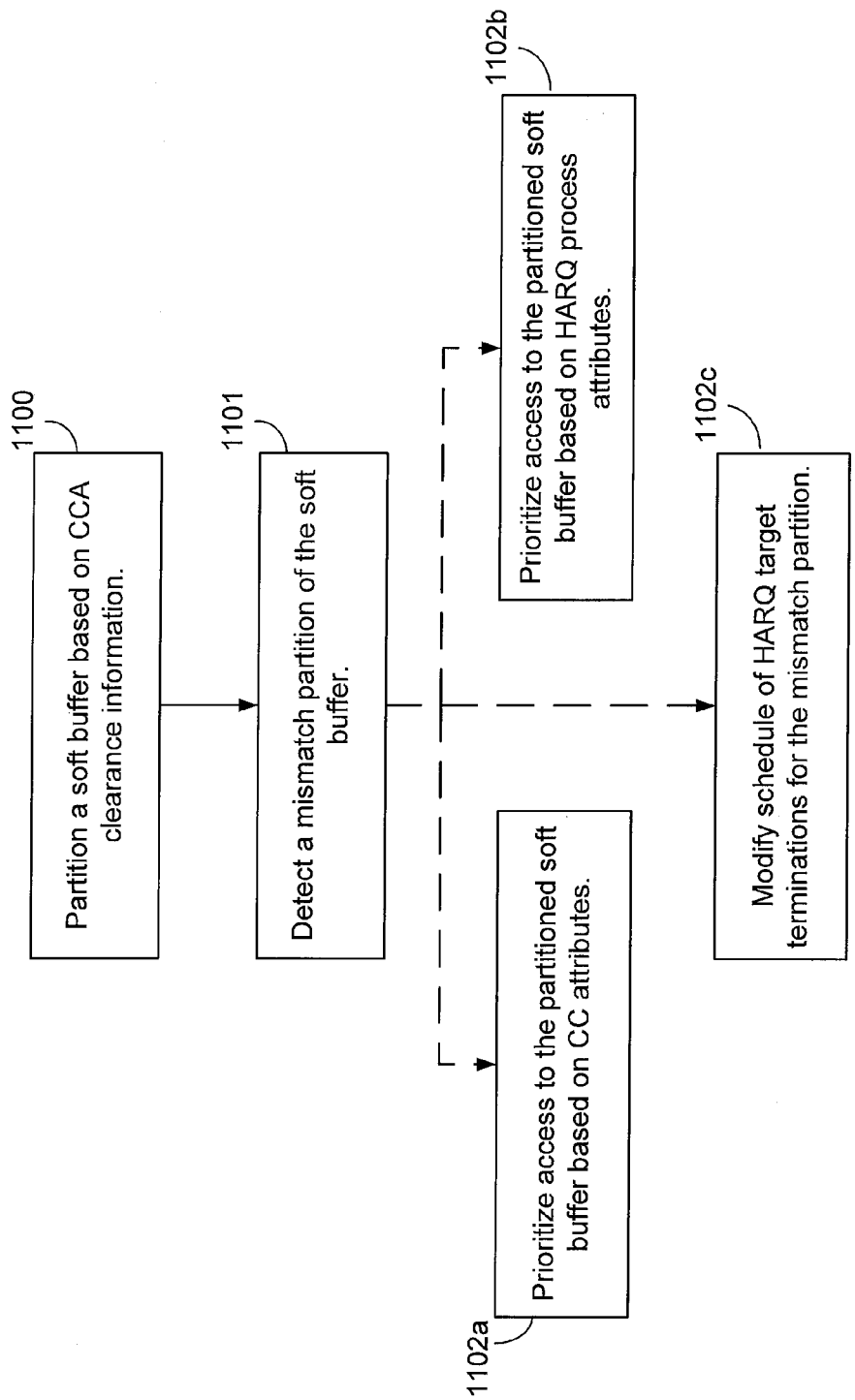

In order to address the issues that arise with underbooking, various aspects of the present disclosure propose possible rules to resolve underbooking through CC dependency or HARQ process dependency. FIG. 11 is a functional block diagram illustrating example blocks executed to implement one aspect of the present disclosure. At block 1100, the soft buffer is partitioned using one of the methods described herein based on CCA clearance information. At block 1101, the base station detects a mismatch partition, either because the number of CCs used for partitioning does not match the actual number of CCs scheduled or the number of HARQ processes used for partitioning does not match the actual number of HARQ processes scheduled on the CC.

In a first aspect of the present disclosure, at block 1102a, the base station prioritizes access to the partitioned soft buffer using CC dependency rules. For example, licensed CCs, if such exist, are given highest priority over unlicensed CCs. Furthermore, among groups of licensed or unlicensed CCs, the groups are also prioritized according to the CC cell index, where a lower cell index (configured through RRC messaging) is given a higher priority.

It should be noted that implementation and/or standardization may be used to minimize or reduce the occurrence of across-CCs soft buffer re-arrangement. Currently in LTE, soft buffer re-arrangement due to mismatch partitioning or underbooking is usually performed within each CC. One example to reduce or minimize such across-CC re-arrangement is to guarantee the soft buffer for a minimum number of HARQ processes for each configured CC.

In a second aspect of the present disclosure, at block 1102b, the base station prioritizes access to the partitioned soft buffer using HARQ process dependency rules. For example, a higher priority may be given to a HARQ process which already has ACK/NAK feedback transmitted to the serving cell. Such HARQ processes would have already received a NAK from the UE, such that it would know that retransmissions would be planned. This is compared with a HARQ process that has not had ACK/NAK feedback transmitted yet (e.g., due to failed UL CCA, or the like). A different priority may be given to HARQ processes based on the number of re-transmissions and/or the amount of time past since the first transmission. Because the older, pending HARQ processes may be pending for a long time, the HARQ processes with the largest number of re-transmissions or long amount of elapsed time since the first transmission may include stale data packets that would not be as critical as more recent HARQ processes. As such, additional aspects may consider assigning higher priority to newly scheduled HARQ processes. A higher priority may also be given to a HARQ process that has a MIMO transmission. Therefore, for a CC with MIMO mode, some subframes may have rank 1 transmissions, while other subframes may have transmissions with a rank greater than 1.

In a third aspect of the present disclosure, at block 1102c, the base station may also modify its own behavior in order to address soft buffer management. For example, eNBs for unlicensed CCs may schedule accordingly based on soft buffer management at the UE and CCA clearance in a frame. If the number of scheduled CCs/HARQ processes is larger than the nominal scheduled CCs/HARQ processes for soft buffer partitioning, various aspects of the present disclosure consider different HARQ target terminations for these CCs/HARQ processes.

It should be noted that, while previously described examples provide discussion between LTE/LTE-A operations with and without unlicensed spectrum, alternative aspects of the disclosure may also be applicable to scenarios where there are only unlicensed carriers configured for a UE or where there are combinations of other types of RATs, e.g., LTE plus improved WiFi, where HARQ is supported. The various aspects of the present disclosure are compatible with each such different networks and RATs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-11 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
determining a number of component carriers (CCs) configured for a user equipment (UE); and
identifying, within the number of CCs, a first set of CCs subject to clear channel assessment (CCA) operation; and
determining for partitioning a soft buffer based on at least in part on the number of CCs and the first set of CCs subject to CCA operation.

2. The method of claim 1, wherein the first set of CCs subject to CCA operation are in an unlicensed spectrum.

3. The method of claim 1, wherein the first set of CCs subject to CCA operations are in a shared licensed spectrum.

4. The method of claim 1, wherein the determining for partitioning the soft buffer based on the first set of CCs subject to CCA operation includes scaling the first set of CCs subject to CCA operation by a scaling factor.

5. The method of claim 1, further including determining a value for the first set of CCs subject to CCA operation for partitioning the soft buffer, where the value is less than the number of CCs in the first set of CCs subject to CCA operation.

6. The method of claim 1, further including determining, within the first set of CCs subject to CCA operation, a number of CCs with CCA clearance for partitioning the soft buffer.

7. The method of claim 1, wherein the number of CCs in the first set of CCs subject to CCA operation is equal to the number of CCs configured for the UE.

8. The method of claim 1, further including determining a second set of CCs includes one or more CCs exempt from CCA operation, wherein the soft buffer is one of: separately or jointly partitioned for the first set of CCs and the second set of CCs.

9. The method of claim 8, wherein joint partitioning of the soft buffer is prioritized for the one or more CCs in the second set of CCs.

10. The method of claim 8, wherein a bit size of the soft buffer is separately determined for the first set of CCs and for the second set of CCs.

11. The method of claim 8, further including:
selecting one of separately or jointly partitioning the soft buffer based on network operations.

12. The method of claim 11, further including:
selecting jointly partitioning the soft buffer when the network operations include carrier aggregation; and
selecting separately partitioning the soft buffer when the network operation includes two or more base stations having non-ideal backhaul communication, wherein the two or more base stations are associated with one or more of the number of CCs configured for the UE.

13. The method of claim 1, wherein partitioning the soft buffer is further based on at least one of a RRC signaling message, whether the UE operates using multiple input, multiple output (MIMO) signaling, a maximum number of downlink hybrid automatic repeat request (HARQ) processes available to the UE based on an uplink/downlink configuration of a base station, or a maximum limit of HARQ processes allowed in determination of a size.

14. The method of claim 13, wherein the maximum limit of HARQ processes, $M_{limit}$, includes a first $M_{limit}$ selected for the first set of CCs and a second $M_{limit}$ selected for the second set of CCs.

15. An apparatus configured for wireless communication, the apparatus comprising:
   at least one processor; and
   a memory coupled to the at least one processor,
   wherein the at least one processor is configured:
      to determine a number of component carriers (CCs) configured for a user equipment (UE); and
      to identify, within the number of CCs, a first set of CCs subject to clear channel assessment (CCA) operation; and
      to determine for partitioning a soft buffer based on at least in part on the number of CCs and the first set of CCs subject to CCA operation.

16. The apparatus of claim 15, wherein the first set of CCs subject to CCA operation are in an unlicensed spectrum.

17. The apparatus of claim 15, wherein the first set of CCs subject to CCA operation are in a shared licensed spectrum.

18. The apparatus of claim 15, wherein the configuration of the at least one processor to determine for partitioning the soft buffer based on the first set of CCs subject to CCA operation includes configuration of the at least one processor to scale the first set of CCs subject to CCA operation by a scaling factor.

19. The apparatus of claim 15, further including configuration of the at least one processor to determine a value for the first set of CCs subject to CCA operation for partitioning the soft buffer, where the value is less than the number of CCs in the first set of CCs subject to CCA operation.

20. The apparatus of claim 15, further including configuration of the at least one processor to determine, within the first set of CCs subject to CCA operation, a number of CCs with CCA clearance for partitioning the soft buffer.

21. The apparatus of claim 15, wherein the number of CCs in the first set of CCs subject to CCA operation is equal to the number of CCs configured for the UE.

22. The apparatus of claim 15, further including configuration of the at least one processor to determine a second set of CCs includes one or more CCs exempt from CCA operation, wherein the soft buffer is one of: separately or jointly partitioned for the first set of CCs and the second set of CCs.

23. The apparatus of claim 21, wherein joint partitioning of the soft buffer is prioritized for the one or more CCs in the second set of CCs.

24. The apparatus of claim 21, wherein a bit size of the soft buffer is separately determined for the first set of CCs and for the second set of CCs.

25. The apparatus of claim 21, further including:
   configuration of the at least one processor to select one of separately or jointly partitioning the soft buffer based on network operations.

26. The apparatus of claim 25, further including:
   configuration of the at least one processor to select jointly partitioning the soft buffer when the network operations include carrier aggregation; and
   configuration of the at least one processor to select separately partitioning the soft buffer when the network operation includes two or more base stations having non-ideal backhaul communication, wherein the two or more base stations are associated with one or more of the number of CCs configured for the UE.

27. The apparatus of claim 15, wherein partitioning the soft buffer is further based on at least one of a RRC signaling message, whether the UE operates using multiple input, multiple output (MIMO) signaling, a maximum number of downlink hybrid automatic repeat request (HARQ) processes available to the UE based on an uplink/downlink configuration of a base station, or a maximum limit of HARQ processes allowed in determination of a size.

28. The apparatus of claim 27, wherein the maximum limit of HARQ processes, $M_{limit}$, includes a first $M_{limit}$ selected for the first set of CCs and a second $M_{limit}$ selected for the second set of CCs.

29. A non-transitory computer-readable medium having program code recorded thereon, that, when executed by one or more computer processors, causes the one or more computer processors to:
   determine a number of component carriers (CCs) configured for a user equipment (UE); and
   identify, within the number of CCs, a first set of component carriers subject to clear channel assessment (CCA) operation; and
   determine for partitioning a soft buffer based on at least in part on the number of CCs and the first set of CCs subject to CCA operation.

30. The non-transitory computer-readable medium of claim 29, wherein the first set of CCs subject to CCA operation are in one of: an unlicensed spectrum, or a shared licensed spectrum.

* * * * *